(12) United States Patent
Bender et al.

(10) Patent No.: US 10,587,748 B1
(45) Date of Patent: Mar. 10, 2020

(54) CURRENT AND FORECAST SIGNAL STRENGTH HAPTIC FEEDBACK ON MOBILE DEVICES

(71) Applicant: INTERNATIONAL BUSINESS MACHINES CORPORATION, Armonk, NY (US)

(72) Inventors: Michael Bender, Rye Brook, NY (US); Gandhi Sivakumar, Bentleigh (AU); Martin G. Keen, Cary, NC (US); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,739

(22) Filed: Nov. 27, 2018

(51) Int. Cl.
| | | |
|---|---|---|
| *H04W 24/00* | (2009.01) | |
| *H04M 1/725* | (2006.01) | |
| *G09B 21/00* | (2006.01) | |
| *H04B 17/318* | (2015.01) | |
| *H04W 4/029* | (2018.01) | |

(52) U.S. Cl.
CPC ...... *H04M 1/72594* (2013.01); *G09B 21/003* (2013.01); *H04B 17/318* (2015.01); *H04W 4/029* (2018.02)

(58) Field of Classification Search
CPC .............. H04M 1/72594; H04W 4/029; G09B 21/003; H04B 17/318
USPC ............................ 455/456.1–456.3; 370/338
See application file for complete search history.

(56) References Cited

U.S. PATENT DOCUMENTS

| | | | |
|---|---|---|---|
| 7,218,310 | B2 | 5/2007 | Tierling et al. |
| 9,629,055 | B2 | 4/2017 | Hussain et al. |
| 9,774,992 | B2 * | 9/2017 | Wilbur .................... H04W 4/02 |
| 2006/0024647 | A1 | 2/2006 | Chesnais et al. |
| 2009/0225046 | A1 | 9/2009 | Kim et al. |
| 2009/0312002 | A1 | 12/2009 | Longobardi |
| 2009/0325647 | A1 | 12/2009 | Cho et al. |
| 2012/0157147 | A1 | 6/2012 | Christoffersson et al. |
| 2013/0307789 | A1 | 11/2013 | Karamath et al. |
| 2015/0358830 | A1 | 12/2015 | Bajko |
| 2016/0057763 | A1 | 2/2016 | Tsuda et al. |

* cited by examiner

*Primary Examiner* — Marcos Batista
(74) *Attorney, Agent, or Firm* — Anthony M. Pallone

(57) ABSTRACT

An embodiment of the invention may include a method, computer program product and system for generating haptic feedback patterns by a mobile device. An embodiment may include generating a haptic feedback in response to a change in a geographic location of the mobile device resulting in a corresponding forecasted change in a network signal strength of the mobile device.

14 Claims, 5 Drawing Sheets

DATA TABLE
220A

| Signal Strength | Location |
|---|---|
| signal_strength_1 | location_1 |
| signal_strength_2 | location_2 |
| ... | ... |
| signal_strength_n | location_n |

FIG. 2A

CURRENT AND FORECAST SIGNAL STRENGTH HAPTIC FEEDBACK ON MOBILE DEVICES

BACKGROUND

Embodiments of the present invention relate generally to the field of mobile electronic devices, and more specifically, to utilizing haptic technology of a mobile device to indicate current and forecasted signal strength.

Haptic technology may be used in mobile electronic devices to recreate the sense of touch (i.e., haptic feedback) by applying forces, vibrations, or motions to the user. Haptic feedback is able to convey information to the user through the use advanced vibration patterns and waveforms. Most mobile electronic devices implement haptic feedback via an eccentric rotating mass (ERM) actuator, consisting of an unbalanced weight attached to a motor shaft, or via a linear resonant actuator (LRA), which moves a mass in a reciprocal manner by means of a magnetic voice coil.

BRIEF SUMMARY

An embodiment of the invention may include a method, computer program product and system for generating haptic feedback patterns by a mobile device. An embodiment may include generating a haptic feedback in response to a change in a geographic location of the mobile device resulting in a corresponding forecasted change in a network signal strength of the mobile device.

BRIEF DESCRIPTION OF THE DRAWINGS

FIG. 2A is a block diagram illustrating a data table stored within the signal and location repository of the mobile device in FIG. 2, in accordance with an embodiment of the invention;

DETAILED DESCRIPTION

Figure 1:
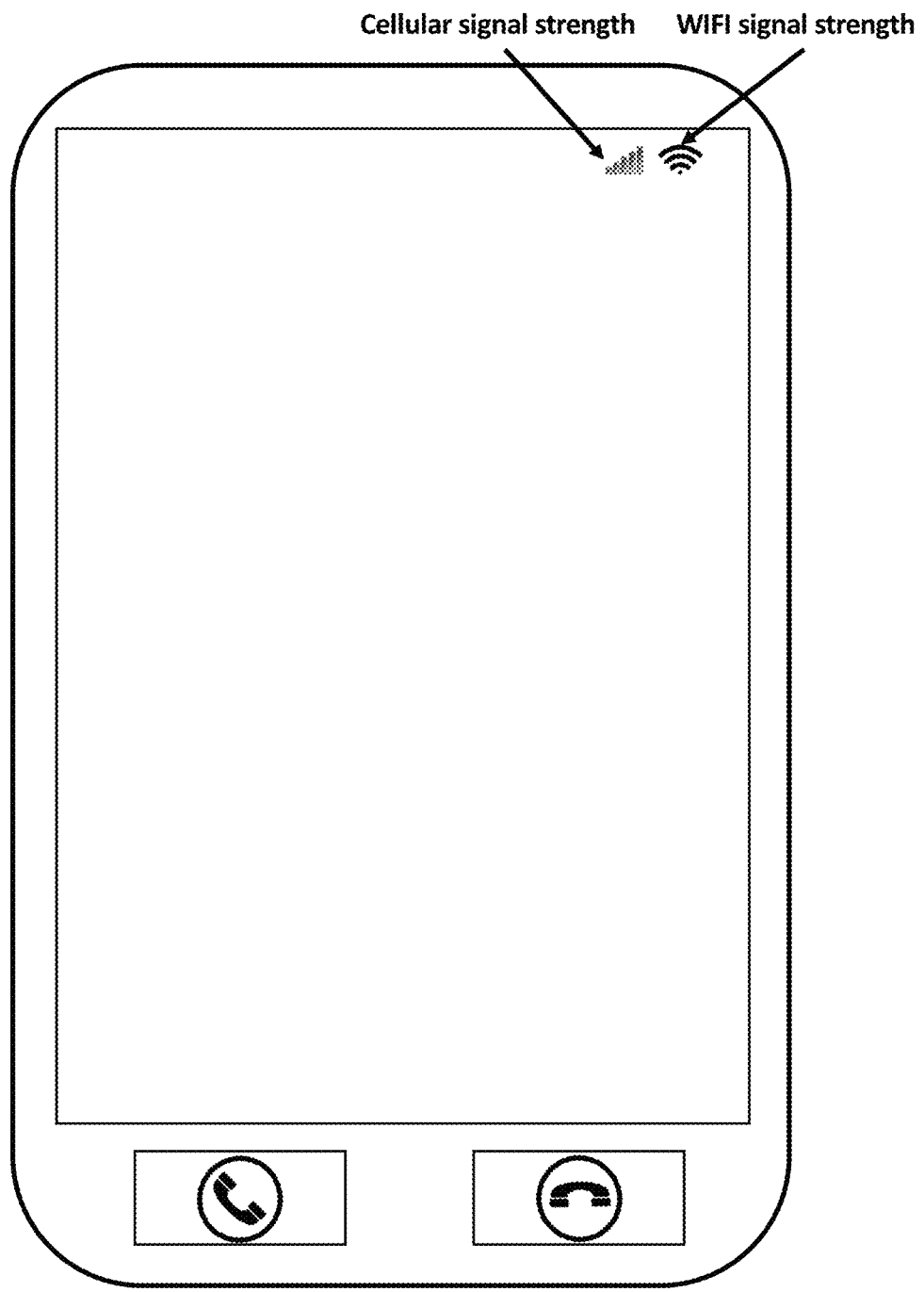
FIG. 1 depicts a mobile communication device with visual indicators showing cellular signal strength and WIFI signal strength, in accordance with an embodiment of the present invention.

Many mobile electronic devices are designed to communicate with their users. Typically, such communication is facilitated through audible and visual cues, such as LEDs, icons, and beeps. For example, mobile communication devices such as cell phones, smart phones, and tablets generally utilize icons to represent, to the user, the signal strength of various communication mechanisms (e.g., cellular service, WIFI signal, and Bluetooth signal), as illustrated in FIG. 1 which depicts a mobile communication device with commonly used visual indicators showing cellular signal strength and WIFI signal strength, in accordance with an embodiment of the present invention.

While the use of icons to represent the signal strength of various communication mechanisms may be effective for some users of mobile communication devices, for others this type of visual cue may be less effective. For example, visually impaired users of mobile communication devices may find icons representing signal strength hard to view due to their size and consequently, these icons may not be effective for visually impaired users. FIG. 1 depicts the relatively small size of icons commonly used to represent cellular and WWI signal strength on mobile communication devices. Some manufacturers of mobile communication devices provide audible solutions for visually impaired users. For example, voice-over features provide a solution whereby upon request, a digital voice can announce a signal strength to be "3 out of 5". However, an audible solution that the user must request may not be as intuitive as an icon that a non-visually impaired user can see at a glance.

The description that follows includes exemplary devices, methods, memory, systems, techniques, instruction sequences and computer program products that embody techniques of the present inventive subject matter. However, it should be understood that the described embodiments may be practiced without these specific details. Well-known instruction instances, protocols, structures and techniques have not been shown in detail in order not to obfuscate the description.

The inventive subject matter includes devices, methods, memory, and systems utilizing haptic technology. The haptic technology can be used in conjunction with mobile devices, such as but not limited to mobile phones. The inventive subject matter describes the use of haptic feedback to indicate current and forecasted signal strength of various communication mechanisms of a mobile device and may be of use to both visually impaired and non-visually impaired users. Embodiments of the present invention may include a mobile device 200, described below, which generates haptic feedback indicting the current signal strength of a given signal (e.g., cellular, WIFI, Bluetooth) that a user can feel and identify as they hold the mobile device. Furthermore, in embodiments of the present invention, mobile device 200 may also generate haptic feedback, that the user can feel and identify, to indicate if the given signal is forecast to become stronger or weaker as the user continues in a particular direction of travel. In doing so, mobile device 200 can communicate to the user that their signal strength is likely to increase or decrease if they continue along their current path of travel.

Embodiments of the present invention will now be described in detail with reference to the accompanying Figures.

Figure 2:
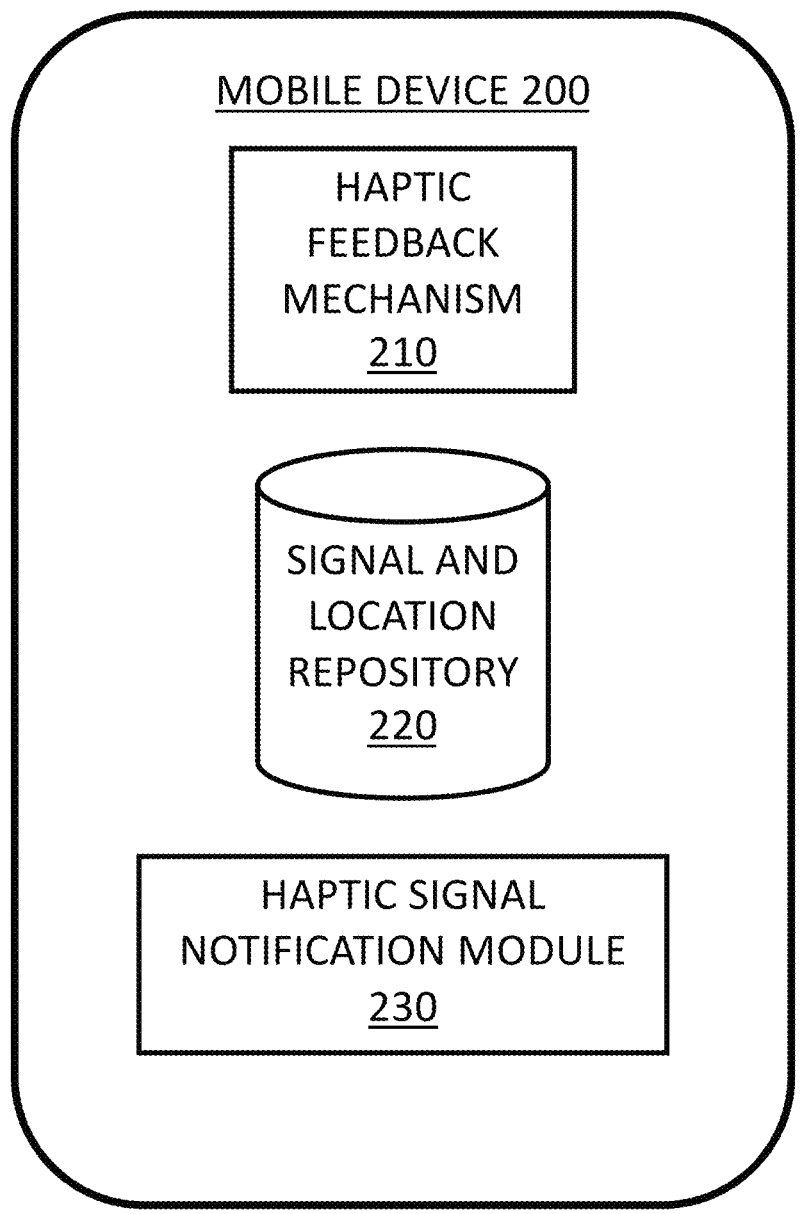
FIG. 2 is a block diagram illustrating a mobile device, in accordance with an embodiment of the present invention.

FIG. 2 is a functional block diagram illustrating mobile device 200, in accordance with an embodiment of the present invention. In an example embodiment, mobile device 200 may include haptic feedback mechanism 210, signal and location tracking repository 220, and haptic signal notification module 230.

Figure 4:
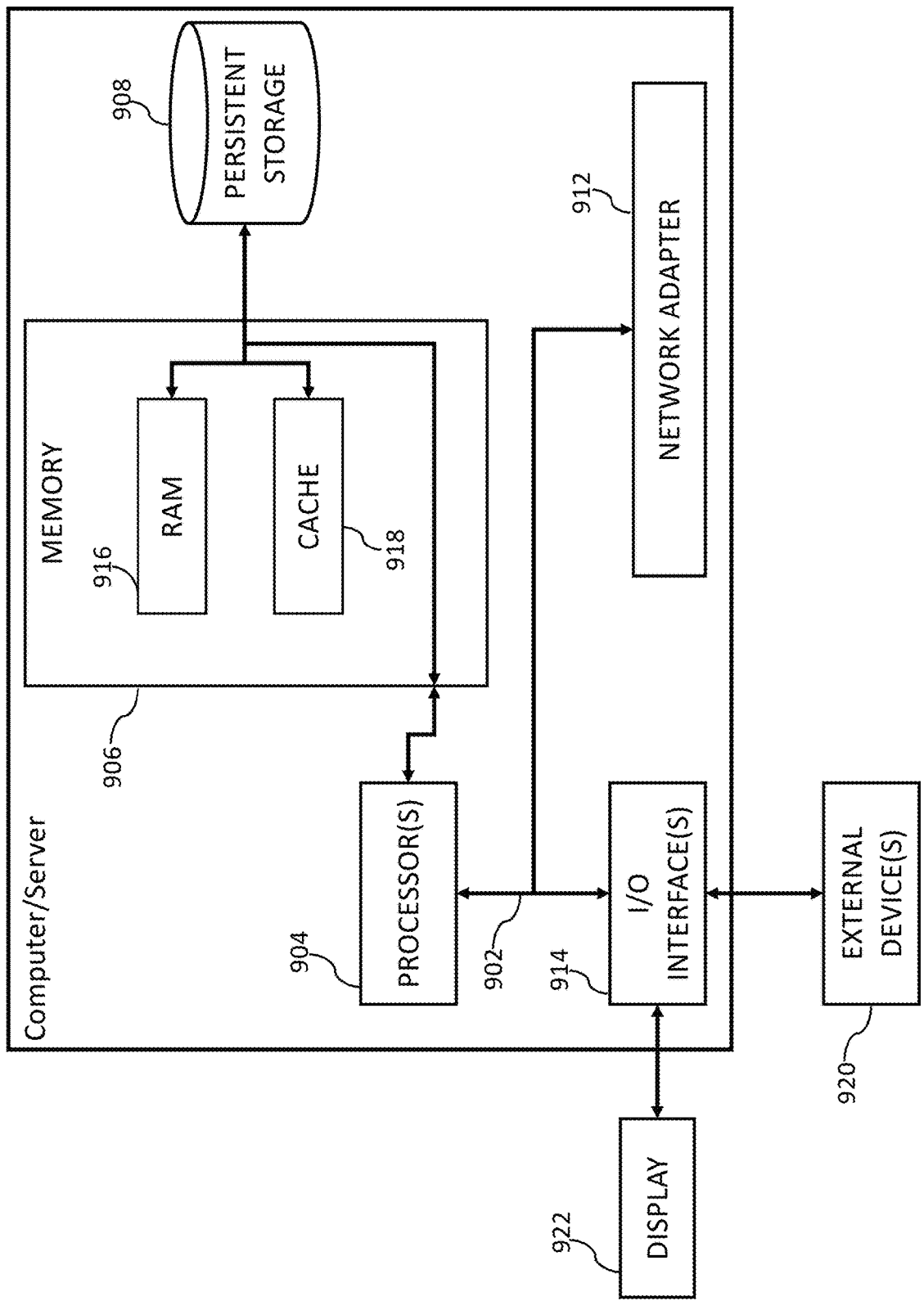
FIG. 4 is a block diagram depicting the hardware components of the mobile device of FIG. 2, in accordance with an embodiment of the invention.

In embodiments of the present invention, mobile device 200 may be a mobile communication device, such as a cellular telephone, a smartphone, a tablet, a personal digital assistant, a gaming device, a wearable computing device, or any other mobile electronic device with a wireless communication link to a network via various communication mechanisms (e.g., cellular, WIFI, and Bluetooth) and capable of supporting the functionality required of embodiments of the invention. Mobile device 200 may be described, generally, with respect to FIG. 4 below. In an example embodiment, mobile device 200 may be a smartphone connected to a cellular network. Furthermore, in an example embodiment, mobile device 200 may be in physical contact with a user. Although not shown, it should be understood that in an embodiment where mobile device 200 is a smartphone, mobile device 200 includes common components of mobile communication devices known in the industry such as, but not limited to, a GPS, a compass, a memory, and a display screen.

In an example embodiment, haptic feedback mechanism 210 provides feedback the user can feel while holding mobile device 200. Haptic feedback mechanisms are well-known in the art of mobile devices. One suitable implementation for haptic feedback mechanism 210 is a small motor (e.g., an eccentric rotating mass actuator) that vibrates to notify the user of certain events, such as button presses, selections on the touch display, alarm events, etc. Another suitable implementation for haptic feedback mechanism 210 is a linear resonant actuator, which moves a mass in a reciprocal manner by means of a magnetic voice coil. The haptic feedback mechanism 210 broadly encompasses any way to notify the user by feel, whether currently known or developed in the future.

In an example embodiment, signal and location tracking repository 220 may be a data storage structure (e.g. a database, a data table, plain-text file, key-value store) stored within a memory, not shown, of mobile device 200. Signal and location tracking repository 220 may store a plurality of signal strength measurements, as monitored by haptic signal notification module 230, described below. Each recorded signal strength measurement may further include a correlated geographical location, as determined by haptic signal notification module 230 using location services (e.g., GPS) of mobile device 200.

In an example embodiment, haptic signal notification module 230 may be a program, or subroutine contained in a program, that may operate to cause the generation of haptic feedback, on a mobile device, which represents a current network signal strength of medium, low, or no signal. Haptic signal notification module 230 may also operate to cause the generation of haptic feedback, on a mobile device, which indicates if a given network signal is forecast to become stronger or weaker as the user continues in a particular direction of travel. In furtherance of the afore mentioned operations, haptic signal notification module 230 may monitor network signal strength of the mobile device and may retrieve a geographic location correlated to the monitored signal strength via a location service (e.g., GPS) of the mobile device. Furthermore, haptic signal notification module 230 may create records of monitored signal strengths and their corresponding geographic locations within signal and location tracking repository 220. In an example embodiment, haptic signal notification module 230 causes haptic feedback mechanism 210 to generate feedback, according to a predefined pattern, which represents a current network signal strength of mobile device 200. Moreover, in an example embodiment, haptic signal notification module 230 causes haptic feedback mechanism 210 to generate feedback, according to another predefined pattern, which indicates if the network signal strength of mobile device 200 is forecast to become stronger or weaker as the user continues in a particular direction of travel. The operations and functions of haptic signal notification module 230 are described in further detail below with regard to FIG. 3.

FIG. 2A illustrates data table 220A stored within signal and location tracking repository 220. Data table 220A is shown as being populated with signal strength entries: signal_strength_1, signal_strength_2, to signal_strength_n; along with their corresponding location entries. In embodiments of the present invention, signal strength entries may include a count of network signal reception bars ranging from zero bars to one less than a maximum number of bars. Moreover, in embodiments of the present invention, location entries may include GPS coordinates, and map locations known to mobile device 200.

Figure 3:
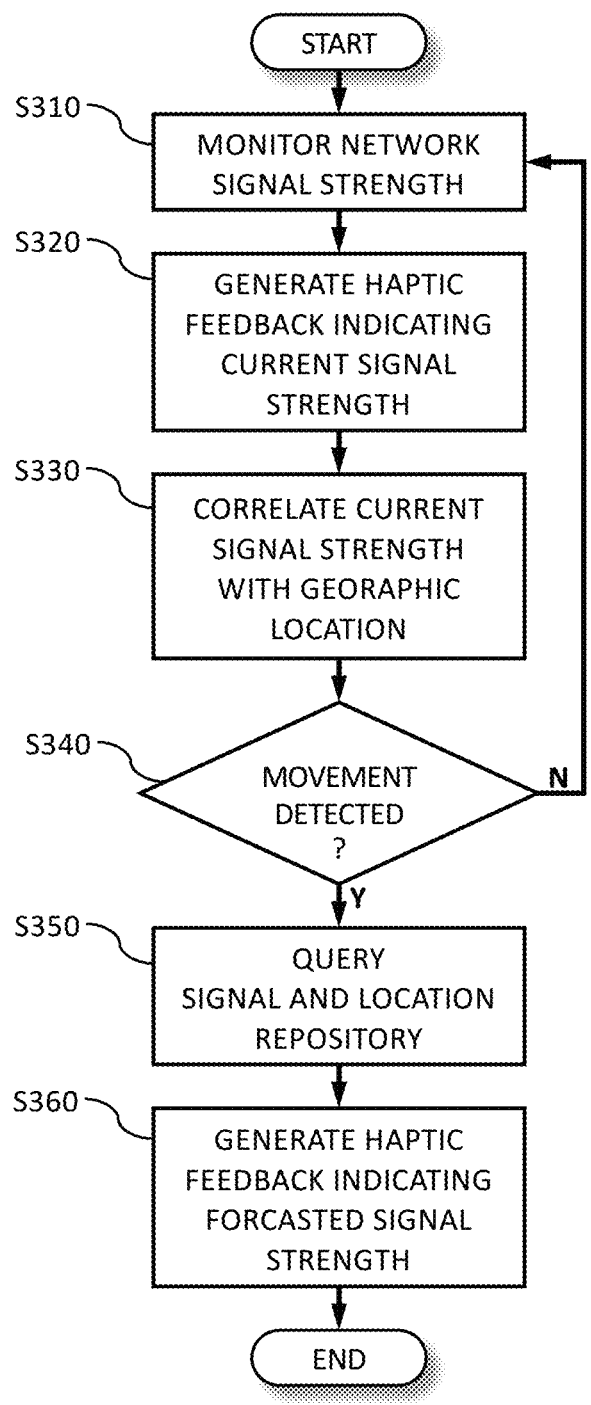
FIG. 3 is a flowchart illustrating the operations of the haptic signal notification module of FIG. 2, in accordance with an embodiment of the invention.

FIG. 3 shows a flowchart illustrating the operations of haptic signal notification module 230 in accordance with an example embodiment of the invention. Referring to step S310, haptic signal notification module 230 may monitor the signal strength of a given communication network (e.g., cellular, WIFI, Bluetooth) to which mobile device 200 is connected. In embodiments of the present invention, a user of mobile device 200 may select which communication network to monitor, via haptic signal notification module 230, for haptic feedback indicating network signal strength. In one embodiment, haptic signal notification module 230 may be activated by the user of mobile device 200 as an accessibility feature. This feature may be built into the OS of mobile device 200 or may be implemented as a stand-alone app. In another embodiment, haptic signal notification module 230 may automatically activate when mobile device 200 is powered on. In an example embodiment, haptic signal notification module 230 monitors the cellular signal strength of mobile device 200.

Referring to step S320, haptic signal notification module 230 may cause the generation of haptic feedback according to a pattern indicative of the current network signal strength in response to the monitored strength of a given network signal changing to a condition below maximum network signal strength such as, but not limited to, medium signal strength (e.g., 2 signal reception bars), low signal strength (e.g., 1 signal reception bar), or no-signal (e.g., 0 signal reception bars). Haptic feedback may also be generated in response to an initial monitoring of the network signal strength identifying a condition below maximum network signal strength. In embodiments of the present invention, haptic feedback patterns may be generated by haptic feedback mechanism 210 at the direction of haptic signal notification module 230. Furthermore, in embodiments of the present invention, haptic feedback may be generated according to predefined patterns which correspond to different network signal strength conditions. For example, a medium signal strength condition generates a low haptic vibration and/or waveform pattern that can be felt by the user when holding the mobile device, whereas a no-signal condition generates a strong haptic vibration and/or waveform pattern that can be felt by the user when holding the mobile device. In another example, these vibration and/or waveform patterns may be reversed whereby a no-signal condition generates a low haptic vibration and/or waveform pattern. In this way a visually impaired user may instantly feel the current strength of a given network signal, as communicated by haptic signal notification module 230 via a haptic feedback pattern, without needing a voice prompt and without attempting to focus on a small network signal strength icon displayed on the screen of the mobile device. The use of a particular predefined haptic feedback pattern to indicate a particular network signal condition (i.e., strength) may be dependent upon a user policy or profile. In an example embodiment, haptic signal notification module 230 may cause haptic feedback mechanism 210 to generate haptic feedback, on mobile device 200, according to a pattern indicative of a low signal strength condition in response to the monitored current strength of the cellular network signal changing to a low signal strength (e.g., 1 signal reception bar).

Referring to step S330, haptic signal notification module 230 may correlate the current network signal strength of mobile device 200 with the current geographical location of mobile device 200. Additionally, haptic signal notification module 230 may also create a record of the monitored network signal strength and correlated geographic location within signal and location tracking repository 220. The haptic signal notification module 230 may periodically record monitored network signal strengths and the location where those signal strengths were monitored using location services of mobile device 200 such as, but not limited to, GPS. The periodically recorded network signal strengths and correlated locations are also stored within signal and location tracking repository 220. In doing so, haptic signal notification module 230 can begin to track network signal strength in various locations where the user has visited, for example, various locations in their home, in the office, at locations they visit, and so forth. Although not depicted in FIG. 3, signal and location tracking repository 220 may also maintain an associated timestamp for each signal strength and corresponding location record. In an example embodiment, haptic signal notification module 230 may create a record of the cellular signal strength monitored in step S310 and its correlated geographic location within signal and location tracking repository 220.

Referring to step S340, haptic signal notification module 230 may utilize location services of mobile device 200 (e.g., GPS, maps) to determine if mobile device 200 has changed geographic location. Haptic signal notification module 230 may determine that mobile device 200 has changed geographic location in response to movement of mobile device 200 resulting from, for example, the user walking down a corridor or across a parking lot. When haptic signal notification module 230 determines that mobile device 200 has changed geographic location, haptic signal notification module 230 retrieves the updated current geographic location of mobile device 200, using location services such as GPS of mobile device 200, and the direction of travel, using the compass of mobile device 200. In response to a detected change in geographic location of mobile device 200, haptic signal notification module 230 may proceed to step S350. However, if haptic signal notification module 230 has not detected a change in geographic location of mobile device 200, haptic signal notification module 230 may proceed to step S310 for continued monitoring of network signal strength. In an example embodiment, haptic signal notification module 230 has detected change in geographic location of mobile device 200, retrieves the updated current geographic location of mobile device 200 and the direction of travel, and proceeds to step S350.

Referring to step S350, haptic signal notification module 230 may extrapolate the expected direction of movement of mobile device 200 and query signal and location tracking repository 220 in order to forecast network signal strength. For example, haptic signal notification module 230 may query signal and location tracking repository 220 to retrieve network signal strength measurements that occurred 50 meters farther away in the direction of travel of mobile device 200. In this way, haptic signal notification module 230 may forecast what the network signal strength of mobile device 200 will be 50 meters from now if the user continues to proceed in the direction of travel retrieved in step S340. In embodiments of the present invention, haptic signal notification module 230 may extrapolate the expected direction of movement of mobile device 200 based on the updated current geographic location of mobile device 200 and the direction of travel retrieved in step S340. In an example embodiment, haptic signal notification module 230 may forecast a strengthening cellular signal based on the extrapolated direction of movement of mobile device 200 and on the query results from signal and location tracking repository 220.

Referring to step S360, haptic signal notification module 230 may cause the generation of haptic feedback according to a pattern indicative of the network signal strength forecasted in step S350. As mobile device 200 changes geographic location, the network signal strength of mobile device 200 may also change. Accordingly, the user may receive haptic feedback to indicate if continued movement in the retrieved direction of travel will likely lead to a strengthening or weakening network signal strength. In embodiments of the present invention, haptic feedback patterns may be generated by haptic feedback mechanism 210 at the direction of haptic signal notification module 230. Furthermore, in embodiments of the present invention, haptic feedback may be generated according to predefined patterns which correspond to forecasted stronger network signal strength and forecasted weaker network signal strength. For example, forecasted stronger network signal strength may be represented by a haptic vibration and/or waveform pattern consisting of short pulses of haptic vibration that can be felt by the user when holding the mobile device, while forecasted weaker network signal strength may be represented by a haptic vibration and/or waveform pattern consisting of long pulses of haptic vibration that can be felt by the user when holding the mobile device. In another example, these vibration and/or waveform patterns may be reversed.

In this way, a user may instantly feel the forecasted strength of a given network signal, as communicated by haptic signal notification module 230 via a haptic feedback pattern, if they continue to proceed in a given direction without needing a voice prompt and without attempting to focus on a small network signal strength icon displayed on the screen of the mobile device. The use of a particular predefined haptic feedback pattern to indicate a strengthening or weakening network signal strength may be dependent upon a user policy or profile. In an example embodiment, haptic signal notification module 230 may cause haptic feedback mechanism 210 to generate haptic feedback, on mobile device 200, according to a pattern indicative of a strengthening network signal strength as forecasted in step S350.

While in an example embodiment haptic signal notification module 230 may extrapolate an expected direction of travel of mobile device 200 and query signal and location tracking repository 220 for signal strength measurements, in another embodiment haptic signal notification module 230 may also interface with map software and expected/planned travel directions (i.e. mapped routes) to allow map software of mobile device 200 to provide the current network signal strength and forecasted network signal strength based on the route options available.

FIG. 3 depicts a block diagram of components of mobile device 200 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Mobile device 200 includes communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The program haptic signal notification module 230 in mobile device 200 is stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The program haptic signal notification module 230 in mobile device 200 may be downloaded to persistent storage 908 through network adapter 912.

I/O interface(s) 914 allows for input and output of data with other devices that may be connected to mobile device 200. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., program haptic signal notification module 230 in mobile device 200, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method comprising:
generating a haptic feedback, by a mobile device, in response to a forecasted change in a network signal strength of the mobile device, wherein the forecasted change in the network signal strength of the mobile device results from on a change in a geographic location of the mobile device, and wherein the forecasted change in the network signal strength of the mobile device is determined by a direction of travel of the mobile device and by queries of previously monitored network signal strengths stored with corresponding geographic locations, and wherein one or more of the geographic locations corresponding with the previously monitored network signal strengths are in the direction of travel of the mobile device, and wherein the direction of travel of the mobile device is along a user determined path of travel, and wherein the haptic feedback in response to a forecasted change in a network signal strength indicative of a strengthening network signal is according to a first pattern, and wherein the haptic feedback in response to a forecasted change in a network signal strength indicative of a weakening network signal is according to a second pattern.

2. The method of claim 1, further comprising:
generating a haptic feedback in response to a current network signal strength of the mobile device falling below a maximum network signal strength; and
storing the current network signal strength along with a correlated geographic location.

3. The method of claim 2, further comprising:
periodically recording the current network signal strength of the mobile device to create a set of recorded network signal strengths; and
storing each recorded network signal strength, of the set of recorded network signal strengths, along with a correlated geographic location for the recorded network signal strength.

4. The method of claim 2, wherein the correlated geographic location is retrieved via a GPS service of the mobile device.

5. The method of claim 2, wherein the haptic feedback is according to one or more predefined patterns indicative of any one of a medium network signal strength, a low network signal strength, and a zero network signal strength.

6. A computer program product comprising:
one or more computer-readable tangible storage devices and program instructions stored on at least one of the one or more computer-readable tangible storage devices, the program instructions executable by a computer, the program instructions comprising:
program instructions to generate a haptic feedback, by a mobile device, in response to a forecasted change in a network signal strength of the mobile device, wherein the forecasted change in the network signal strength of the mobile device results from on a change in a geographic location of the mobile device, and wherein the forecasted change in the network signal strength of the mobile device is determined by a direction of travel of the mobile device and by queries of previously monitored network signal strengths stored with corresponding geographic locations, and wherein one or more of the geographic locations corresponding with the previously monitored network signal strengths are in the direction of travel of the mobile device, and wherein the direction of travel of the mobile device is along a user determined path of travel, and wherein the haptic feedback in response to a forecasted change in a network signal strength indicative of a strengthening network signal is according to a first pattern, and wherein the haptic feedback in response to a forecasted change in a network signal strength indicative of a weakening network signal is according to a second pattern.

7. The computer program product of claim 6, further comprising:
program instructions to generate a haptic feedback in response to a current network signal strength of the mobile device falling below a maximum network signal strength; and
program instructions to store the current network signal strength along with a correlated geographic location.

8. The computer program product of claim 7, further comprising:
program instructions to periodically record the current network signal strength of the mobile device to create a set of recorded network signal strengths; and
program instructions to store each recorded network signal strength, of the set of recorded network signal strengths, along with a correlated geographic location for the recorded network signal strength.

9. The computer program product of claim 7, wherein the correlated geographic location is retrieved via a GPS service of the mobile device.

10. The computer program product of claim 7, wherein the haptic feedback is according to one or more predefined patterns indicative of any one of a medium network signal strength, a low network signal strength, and a zero network signal strength.

11. A computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to generate a haptic feedback, by a mobile device, in response to a forecasted change in a network signal strength of the mobile device, wherein the forecasted change in the network signal strength of the mobile device results from on a change in a geographic location of the mobile device, and wherein the forecasted change in the network signal strength of the mobile device is determined by a direction of travel of the mobile device and by queries of previously monitored network signal strengths stored with corresponding geographic locations, and wherein one or more of the geographic locations corresponding with the previously monitored network signal strengths are in the direction of travel of the mobile device, and wherein the direction of travel of the mobile device is along a user determined path of travel, and wherein the haptic feedback in response to a forecasted change in a network signal strength indicative of a strengthening network signal is according to a first pattern, and wherein the haptic feedback in response to a forecasted change in a network signal strength indicative of a weakening network signal is according to a second pattern.

12. The computer system of claim 11, further comprising:
program instructions to generate a haptic feedback in response to a current network signal strength of the mobile device falling below a maximum network signal strength; and
program instructions to store the current network signal strength along with a correlated geographic location.

13. The computer system of claim 12, further comprising:
program instructions to periodically record the current network signal strength of the mobile device to create a set of recorded network signal strengths; and
program instructions to store each recorded network signal strength, of the set of recorded network signal strengths, along with a correlated geographic location for the recorded network signal strength.

14. The computer system of claim 12, wherein the haptic feedback is according to one or more predefined patterns indicative of any one of a medium network signal strength, a low network signal strength, and a zero network signal strength.

* * * * *